Patented Dec. 21, 1948

2,457,003

UNITED STATES PATENT OFFICE 2,457,003

FRICTION ELEMENT

Ray E. Spokes, Ann Arbor, Mich., assignor to American Brake Shoe Company, New York, N. Y., a corporation of Delaware No Drawing. Application July 31, 1944, Serial No. 547,523

2 Claims. (Cl. 260—3)

This invention relates to friction elements and particularly to those which are suitable for heavy duty use as by being employed in brakes of trucks, busses and kindred relatively heavy automotive vehicles and which are also suitable for use in many industrial applications.

Friction elements of the aforesaid character that are in use today of the so-called molded type usually consist of a fibrous material such as asbestos, friction controlling and imparting ingredients and a cured bond or binder. Among the materials that have been used as a bond or binder in such friction elements are the phenol-aldehyde resins and particularly those of the so-called heat resistant type and mixtures of such a resin or resins with hydrocarbon either of the natural, synthetic or reclaimed rubber type.

Friction elements having resins of the aforesaid type as the bond therein have a relatively low coefficient of friction. Moreover, in the course of use of friction elements so bonded, the operative surface thereof tends to glaze and this quite detrimentally effects the friction characteristics of the elements. In order to enhance the friction properties of such resin bonded friction elements various materials, usually in a relatively finely divided state, have been incorporated in the elements, and among the materials which have been so used are finely divided cured rubber particles, which are frequently derived from scrap tire carcasses, and also a finely divided polymer derived from the liquid from the outer shell of the cashew nut. However, in the course of use of friction elements including such materials, it has been observed that such materials are often burned out or work free of the friction elements in the course of use thereof which frequently quite objectionably increases the rate of wear in such friction elements.

In those instances where friction elements of the aforesaid character have been bonded with a mixture of a phenol-aldehyde resin and a rubber hydrocarbon and particularly in those instances where resort has beeen had to either natural or reclaimed rubber hydrocarbon, it has been observed that the elements tend to increase in size during the course of use thereof, a condition known in the art as swelling, which is highly objectionable since the apparatus in which such elements are employed is usually arranged in such a way that the clearance between the operative parts is rather small and such swelling of the friction elements may impair the operation of the apparatus and also may create a drag condition which results in overheating the friction elements which yet further detrimentally effects the same. A still further objection to the use of rubber hydrocarbon along with phenol-aldehyde resin as a bond in friction elements is that the friction heat generated in the course of use of the elements may often cause the rubber hydrocarbon to break down, which is to say, liquify, and when this occurs a condition known as fade frequently arises and this also detrimentally affects the operation of the friction elements. The degree to which these conditions are manifested in the course of the use of friction elements including rubber hydrocarbon is almost directly proportional to the quantity of such hydrocarbon employed in the bond for the greater the quantity, the greater the tendency for the aforesaid and kindred objectionable conditions to arise.

Thus, the primary objectionable condition which arises in the course of use of friction elements bonded as above described is a detrimental loss of friction, which arises from the glazing effect in friction elements bonded primarily with phenol-aldehyde resin, and which arises by reason of a breakdown of the rubber hydrocarbon in friction elements including such a material as at least a part of the bond thereof.

It is therefore the primary object of the present invention to stabilize the friction characteristics of friction elements, particularly those intended for heavy duty service, and particularly to avoid deterioration of the friction characteristics in such elements.

Friction elements of the character to which this invention primarily relates are often subjected to relatively high temperatures in the course of use thereof, such temperatures sometimes being as high as 1000° F. on the surface of the element, and in some instances it has been observed that the temperature in the element beneath the operative surface thereof may rise to as much as 600° F. The bonds or binders which have been employed heretofore in friction elements are organic in nature and even though some of such organic bonds or binders exhibit greater heat resistance than others, all display a tendency to decompose when continuously subjected to relatively high temperatures, as aforesaid, in the course of use thereof. It is therefore desirable that the quantity of bond or binder included in any particular friction element be kept at a minimum since so to do will reduce the quantity of heat decomposable materials in the friction elements to a minimum. While it is, therefore, desirable to keep the quantity of bond in friction elements at a minimum, this must not be done to such extent as will detrimentally impair the physical structure of the elements since the primary function of the bond is to maintain the various ingredients of the elements in proper association one with the other. While phenol-aldehyde resins embody relatively good bonding properties and also possess good heat resistance, the use of such resins alone as bonds or binders in friction elements is objectionable for reasons such as those hereinabove set forth. Furthermore, while the rubber hydrocarbon has a tendency to give rise to the objectionable conditions, such as those hereinabove discussed with reference to such material, it is nevertheless advantageous to utilize this hydrocarbon in friction elements along with phenol-aldehyde resin because the hydrocarbon has the effect of softening the friction elements and thereby improving the abrasion resistance of the elements, but care nevertheless must be taken for if rubber hydrocarbon is used to excess to bring about this desirable result, this may give rise to objectionable conditions such as those hereinabove set forth.

Therefore, heretofore in compounding molded heavy duty friction elements, from forty to sixty per cent by weight of asbestos fiber has been employed along with a bond content of between ten to twenty per cent by weight of the mixture, the balance having been made up by materials which serve as curing agents and friction controlling and imparting ingredients and some of such materials have sometimes been added for the purposes of improving the wear properties of the elements.

It is therefore yet another object of this invention to maintain the proportion of the bond in friction elements near the desired optimum, which is to say between ten and twenty per cent by weight of the total composition and preferably at about fifteen per cent of the total composition, and yet at the same time avoid any tendency of the elements to glaze or to swell or exhibit excessive wear, and also to avoid detrimental liquifaction of the ingredients of the bond.

Because of the relatively high heat resistance and desirable friction properties of phenol-aldehyde resins, it is advantageous to utilize at least some of this type resin in the bond of a friction element. Yet further, because of the softening of the friction element and the advantages which accrue therefrom which arise when rubber hydrocarbon is used in friction elements, it is advantageous to incorporate at least some of this hydrocarbon in friction elements. Heretofore in those instances where the proportion of the bond or binder in a friction element has been approximately fifteen per cent by weight of the total composition, the most advantageous results have been realized by utilizing phenol-aldehyde resin or resins and the rubber hydrocarbon in approximately equal proportions but in such circumstances it has been difficult to avoid the accrual of the aforesaid objectionable conditions.

It is, therefore, another object of my invention to enable approximately one-half of the total bond or binder content of a friction element to be afforded by a heat reactive phenol resin and to also employ a sufficient quantity of the rubber hydrocarbon as to realize the benefits to be derived from the use of such material in friction elements and yet to avoid the accrual of the hereinabove set forth and kindred conditions.

It has been proposed heretofore to employ the liquid derived from the shell of the cashew nut, which is commonly known as cashew nut liquid, either as the bond or binder or as a part of the bond or binder in friction elements, and it has been proposed to utilize this liquid or polymer as such or in the form of a resin afforded by reacting the polymer with an aldehyde or with a hexamethylenetetramine or other so-called resin forming material. So to do, however, has not proven to be particularly satisfactory since as the resulting friction elements often either lacked sufficient physical strength or in the course of cure of the polymer, or in the use of the element, objectionable warpage and shrinkage would sometimes accrue.

I have found, however, that the rubbery mass afforded by extended, but incomplete, polymerization of cashew nut shell liquid, which mass of itself does not possess bonding properties, may be used along with phenol-aldehyde resin and rubber hydrocarbon in the bonding of friction elements and so to do is yet another object of this invention. An object ancillary to the foregoing is to relate the quantity of such rubbery polymerized cashew nut shell liquid to the quantity of bonding material employed so as to thereby insure uniform distribution of the bonding material throughout the friction materials and hence insure effective bonding of the ingredients one to the other, the rubbery polymerized cashew nut shell liquid serving as an extender of the bonding material whereby what has heretofore been considered as being insufficient quantity of bonding material serves to properly bond together the ingredients of molded composition friction elements.

Other and further objects of the present invention will be apparent from the following description and claims wherein the preferred embodiment of this invention and the principle thereof and what I now consider to be the best mode in which I have contemplated applying that principle are set forth. Other embodiments of the invention embodying the same or equivalent principles may be used and changes may be made as desired by those skilled in the art without departing from the present invention and the purview of the appended claims.

The rubbery polymerized cashew nut shell liquid which I prefer to employ in the practice of my invention is afforded by heat polymerizing such a liquid to such an extent that the polymerization is so nearly completed that but a relatively small proportion of acetone extractables remain in the polymer, the preferred form of such polymer containing less than 22 per cent benzol extractables. This polymer exhibits in friction elements the characteristic relatively good frictional properties of cashew nut shell liquid but at the same time by reason of its physical state enables a minimum quantity of rubber hydrocarbon to be employed since an intermixture of this polymer and hydrocarbon along with phenol resin may be uniformly distributed throughout the friction elements, thereby enabling what has heretofore been considered to be an insufficient quantity of phenol resin and hydrocarbon to properly bond together the various ingredients of molded friction elements.

In order to realize this result, the rubber hydrocarbon, either natural, synthetic or reclaimed, is broken down on a so-called rubber mill or in what is known as a Banbury mixer. In the course of such operation the rubbery polymerized cashew nut shell liquid is added as the operation proceeds so as to thereby bring about an intimate admixture of the polymer and the hydrocarbon. Once such an intimate admixture of the cashew polymer and rubber hydrocarbon has been effected, this admixture is dissolved in a suitable solvent so as to afford a cement as by dissolving the admixture in benzol, petroleum naphtha or the like to afford what is commonly referred to as a forty per cent solids cement. Thereafter a heat reactive phenol-aldehyde type resin is added to the cement, either in liquid form or as a pulverulent solid. Preferably the phenol resin is added to the cement while the same is being agitated, as by being constantly stirred, so as to thereby bring about a uniform dispersion of the resin in the cement.

In utilizing the admixture of cashew polymer, rubber hydrocarbon and phenol-aldehyde resin dispersed in a solvent as aforesaid in the compounding of friction elements, pulverulent friction controlling and imparting ingredients, along with a pulverulent curing or vulcanizing agent such as sulphur and auxiliary accelerators, such as are well understood in the art, are added to the admixture. This is desirably effected by constantly stirring the aforesaid admixture and gradually adding the pulverulent materials thereto until a uniform dispersion has been attained. Among the friction controlling and imparting ingredients that may advantageously be utilized in friction elements is the dust derived from pulverizing completely polymerized cashew nut shell liquid or the reaction product of cashew nut shell liquid, a dust such as that derived from completely sulphurized or polymerized vegetable drying oils, either synthetic or natural, or vulcanized rubber hydrocarbon particles such as are disclosed in my copending United States application Serial No. 465,734, filed November 16, 1942, now Patent No. 2,428,298, issued September 30, 1947. Among other finely divided materials which may be used as friction controlling or imparting ingredients is finely divided graphite or bonded graphite particles of the nature disclosed in my Patent No. 2,276,070, patented March 10, 1942. Yet other materials that may be used are precipitated barium sulphate and basic lead sulphate. Additionally and while constantly stirring the above referred to mixture, metal particles such as brass chips may be added to the mixture and finally a fibrous material such as asbestos.

Once all the various ingredients have been introduced into the mixer, which is desirably of the kneader type, a lid is secured on the mixer and the mixing is continued for a sufficient time to insure the thorough intermixing of the ingredients, this usually being a period of approximately one-half hour. Thereafter the lid is removed and the mixing is continued whereupon part of the solvent used in forming the aforesaid cement is driven off. The mixing operation is continued until the mixture breaks down into particles of approximately pea size. When this condition is attained the mixing operation is interrupted and the mixture is then either subjected to vacuum or heat or both to drive off the remaining solvent, care being exercised in this operation to avoid setting up or curing of the bond. The mixture is next formed into friction element shapes and these shapes are then subjected to a curing operation which is desirably effected by heat and pressure.

Heretofore in compounding composition friction elements, where phenol-aldehyde resin and rubber hydrocarbon have been employed as the bond, the best results have been realized by employing these materials in substantially equal proportions. Thus, where eight parts by weight of phenol-aldehyde resin have been used, a like number of parts by weight of rubber hydrocarbon have been used. In the practice of the present invention, however, the quantity of hydrocarbon may be reduced substantially and yet the resulting friction elements are superior to those which have been used heretofore. The reason for this is believed to be that the rubbery cashew nut shell liquid polymer, that is employed in accordance with this invention, serves as an extender of the rubber hydrocarbon and promotes the uniform distribution of this hydrocarbon and the phenol resin throughout the ingredients of the elements. As an example of this, if it is attempted to compound friction elements in accordance with the hereinafter set forth formulae without using approximately the specified quantities of the cashew polymer, the resulting products are useless as friction elements, since these products are weak structurally and lack the needed frictional characteristics. Furthermore, it is desirable that the ratio between the quantity of rubber hydrocarbon and cashew polymer employed be kept within rather closely confined limits for otherwise the benefits to be derived from the practice of the present invention are not realized. Thus, friction elements were compounded in accordance with the following formulae and thereafter these elements were subjected to tests, the results of such tests being set forth hereinafter, the formulae according to which such elements were compounded being the following in which all parts are indicated by weight:

|  | Formula A | Formula B | Formula C |
|---|---|---|---|
| Asbestos | 24 | 24 | 24 |
| Brass Chips | 8 | 8 | 8 |
| Friction Controlling and Imparting Ingredients | 35 | 25 | 23 |
| Heat-reactive phenol-aldehyde resin | 8 | 8 | 8 |
| Butadiene-styrene copolymer | 1 |  | 1 |
| Reclaimed rubber | 6.77 (3.45*) | 3.5 (1.75*) | 3.5 (1.75*) |
| Sulphur and accelerators | 2.8 | 2.2 | 2.2 |
| Cashew polymer | 2 | 4 | 6 |

* Indicates actual quantity of rubber hydrocarbon, the balance being fillers and vulcanizing agents.

In each instance, in compounding friction elements in accordance with the foregoing formulae, an identical grade and kind of asbestos and brass chips were employed. Likewise the friction controlling and imparting ingredients specified in each of the aforesaid formulae were identical and are typified by those to which reference has been made hereinabove, these having been used in quantities and for purposes well understood in the art. The reclaimed rubber utilized was that derived from scrap inner tubes and was of the grade commonly specified as containing fifty-one per cent rubber hydrocarbon. The specified sulphur and accelerators are employed for curing or vulcanizing the rubber hydrocarbon as is well understood. Identical phenol-aldehyde resins were employed and these were of the kind well known and commonly used in the art.

When the ingredients specified in the foregoing formulae had been intermixed in the manner explained hereinabove and the mixtures had been formed into friction element shapes, these shapes were subjected to a pressure of approximately two thousand pounds per square inch at a temperature of about 325° for a period of about five hours.

Each of the resulting frictions was thereafter tested to determine the coefficient of friction thereof under different operative conditions. To this end, each element was applied to the periphery of a rotating member under a pressure of one hundred pounds per square inch for a period of thirty seconds and the element was then retracted from the periphery of the member for a period of one minute, such application and retraction of each element having been intermittently effected for a period of one hour while the member was rotating at a speed of one thousand feet per minute, then for a period of one hour while the member was rotating at a speed of two thousand feet per minute and then for a period of one hour while the member was rotating at a speed of three thousand feet per minute. The average coefficient of friction of friction elements compounded under the foregoing formulae and under the aforesaid operative conditions was as follows:

|  | Coefficient of Friction | | |
| --- | --- | --- | --- |
|  | Formula A | Formula B | Formula C |
| 1,000 Ft. per Min | 0.378 | 0.310 | 0.401 |
| 2,000 Ft. per Min | 0.323 | 0.346 | 0.291 |
| 3,000 Ft. per Min | 0.250 | 0.326 | 0.254 |

From the above it will be seen that the friction elements compounded according to formula B exhibit a comparatively uniform coefficient of friction in each of the different operative conditions. It is well known, other conditions being equal as they were in the aforesaid tests, that the greater the speed of the rotating member to which a friction element is applied, the greater the temperatures to which the friction elements will be subjected by reason of the heat generated during the time the friction element is applied to the member. It is also well known in the friction element art that the coefficient of friction of a friction element tends to decrease as the temperature to which element is subjected increases. It will be noted, however, that the decrease in the coefficient of friction exhibited by friction elements compounded according to formula B is less than that exhibited by friction elements compounded according to either formula A or formula C. This is believed to be attributable to ratio between the quantities of cashew polymer and rubber hydrocarbon specified in the respective formulae.

Thus, in formula B, 4.0 parts by weight of cashew polymer are used with 2.75 parts by weight of rubber hydrocarbon. However, in formula A, but 2.0 parts of cashew polymer are used with 4.45 parts of rubber hydrocarbon. Yet further, in formula C, 6.0 parts of cashew polymer are used with 2.75 parts of rubber hydrocarbon.

The ratio of the total weight of the various ingredients of the bond, relative to other ingredients specified in formulae A, B and C, may be varied in accordance with the ratios therein indicated, although the quantity of phenol-aldehyde resin specified in each of the formulae is the same. However, while an identical quantity of rubber hydrocarbon is specified in formulae B and C, a greater quantity was required in order to compound a friction element in accordance with formula A. Thus, when but 2.75 parts by weight of rubber hydrocarbon is used with but 2 parts by weight of cashew polymer and these quantities of these materials are used with the quantities specified for the other ingredients in formula B or formula C, the resulting products are not comparable to the friction elements compounded in accordance with formula B or formula C. It was necessary, therefore, to specify an increased quantity of rubber hydrocarbon in formula A and then, to maintain the ratio of bond to other ingredients like that in formulae B and C, it was necessary to use an increased quantity of friction controlling and imparting ingredients in formula A. Other than this, however, formulae A, B and C correspond.

The friction elements compounded in accordance with these formulae, however, do not display like friction characteristics since, as shown by the results of the tests set forth hereinabove, the coefficient of friction of friction elements compounded in accordance with formulae A and C does not remain substantially uniform under different operating conditions as does the coefficient of friction of friction elements compounded in accordance with formula B. Moreover, the rate of wear of friction elements compounded in accordance with formulae A and C is greater than that of friction elements compounded in accordance with formula B. This does not mean, however, that friction elements compounded in accordance with formulae A and C would not be useful as such but it does show that the advantages of this invention may best be realized when the ratio between the quantity of cashew polymer and rubber hydrocarbon employed is in order of 4.0 parts by weight of cashew polymer to 2.75 parts by weight of rubber hydrocarbon when these substances are used with phenol-aldehyde resin of the heat reactive type and the bond is in the order of sixteen per cent by weight of the other ingredients of the friction element.

Furthermore, an important aspect of this invention is that the advantages to be derived from the use of rubber hydrocarbon in friction elements may be realized without including in such elements such an amount of this hydrocarbon as might give rise to the objectionable conditions discussed hereinabove that have been encountered in the use of friction elements including rubber hydrocarbon as the bond or as a part of the bond thereof. Thus, heretofore, best results have been realized when rubber hydrocarbon and a phenol-aldehyde resin were utilized in substantially equal proportions, but even in such circumstances the objectionable conditions accruing from the use of rubber hydrocarbon in friction elements were sometimes encountered. As is shown by formulae A, B and C, set forth hereinabove, which are exemplary of formulae in accordance with which friction elements may be compounded in accordance with the present invention, the quantity of rubber hydrocarbon employed along with phenol-aldehyde resin is materially less than the quantity of phenol-aldehyde resin that is employed. This enables the superior heat resistance and good bonding properties of phenol-aldehyde resins of the heat reactive type to be realized in friction elements and at the same time it enables a sufficient quantity of rubber hydrocarbon to be employed to realize the benefits that accrue from the use of such hydrocarbons in friction elements.

However, it is essential that the cashew polymer be used along with the phenol-aldehyde resin and the rubber hydrocarbon for otherwise proper distribution of the bonding materials throughout the other ingredients is not realized, as is demonstrated by the fact that friction elements cannot be compounded in accordance with formula A if the quantity of rubber hydrocarbon employed corresponds to that specified in formulae B and C. Thus the cashew polymer serves as an extender of the rubber hydrocarbon and insures uniform distribution of the bonding ingredients throughout the friction elements. Yet further, the good frictional characteristics of cashew nut shell liquid are exhibited by the cashew polymer that is employed in the practice of this invention. However, as is shown by formula C, if the proportion of cashew polymer employed materially departs from the preferred ratio hereinabove set forth, the benefits to be derived from this invention tend to decrease. This is believed to be due to the fact that the cashew polymer that is employed in accordance with the practice of the present invention does not possess desirable bonding properties.

Where reference is made herein to cashew polymer and it will be understood that this is a product afforded by extended but incomplete polymerization of cashew nut shell liquid, such polymerization being carried out to such an extent that the benzol extractable portion averages twenty-two per cent and where reference is made herein to rubbery cashew polymer, this is a designation of this particular extended but incompletely polymerized cashew nut shell liquid. Moreover, the cashew nut shell liquid to which reference is made herein is that which occurs in the cellular husk or shell which grows about the kernel of the cashew nut and this liquid contains anacardic acid and cardol. Where reference is made herein to cashew nut shell liquid, it is intended to cover these materials together or separately from whatever sources they may originate whether natural or artificial in so far as they are effective in producing the results herein set forth.

It will be apparent from the foregoing description that the hereinabove set forth objects and kindred objects of this invention may be realized by practicing the invention in the manner hereinabove set forth, but while I have described a preferred form of my invention, it is to be understood that this is capable of variation and modification and I therefore do not wish to be limited to the precise details set forth, but desire to avail myself of such changes and modifications as fall within the purview of the following claims.

I claim:

1. A friction element for use upon vehicular brakes and comprised of a mass of friction material, inert filler, and friction modifying agents bonded with the heat-reaction product of a mixture of vulcanizable hydrocarbon selected from the group consisting of natural rubber, reclaimed rubber and synthetic vulcanizable butadiene copolymers and mixtures thereof, a vulcanizing agent, a heat-reactive phenolic-aldehyde resin, and polymerized cashew nut shell liquid which has been polymerized until it is highly viscous and of a rubbery consistency and contains not substantially more than twenty-two per cent of its weight of benzol-extractable unpolymerized material, the heat-reactive phenolic-aldehyde resin component and the vulcanizable hydrocarbon component of the bond being incorporated therein in a ratio of not substantially less than two parts of the heat-reactive phenolic-aldehyde resin to one part of the vulcanizable hydrocarbon, by weight, the polymerized cashew nut shell liquid component and the vulcanizable hydrocarbon component of the bond being incorporated therein in a ratio of not substantially more nor substantially less than 4.0 parts of the polymerized cashew nut shell liquid to 2.75 parts of vulcanizable hydrocarbon, by weight.

2. A friction element as defined in claim 1 in which the vulcanizable hydrocarbon component of the bond is composed of a vulcanizable synthetic butadiene copolymer and reclaimed rubber in a ratio of not substantially more nor substantially less than 1.75 parts of reclaimed rubber, exclusive of inert filler and vulcanizing agents incorporated in said reclaimed rubber, to 1 part of the vulcanizable synthetic butadiene copolymer, by weight.

RAY E. SPOKES.

REFERENCES CITED

The following references are of record in the file of this patent:

UNITED STATES PATENTS

| Number | Name | Date |
| --- | --- | --- |
| 2,164,326 | Harvey | July 4, 1939 |
| 2,165,140 | Harvey | July 4, 1939 |
| 2,227,424 | Bruce et al. | Jan. 7, 1941 |
| 2,245,203 | Kuzmick et al. | June 10, 1941 |
| 2,253,608 | Bruce | Aug. 26, 1941 |
| 2,256,646 | Kuzmick et al. | Sept. 23, 1941 |